Patented Feb. 21, 1939

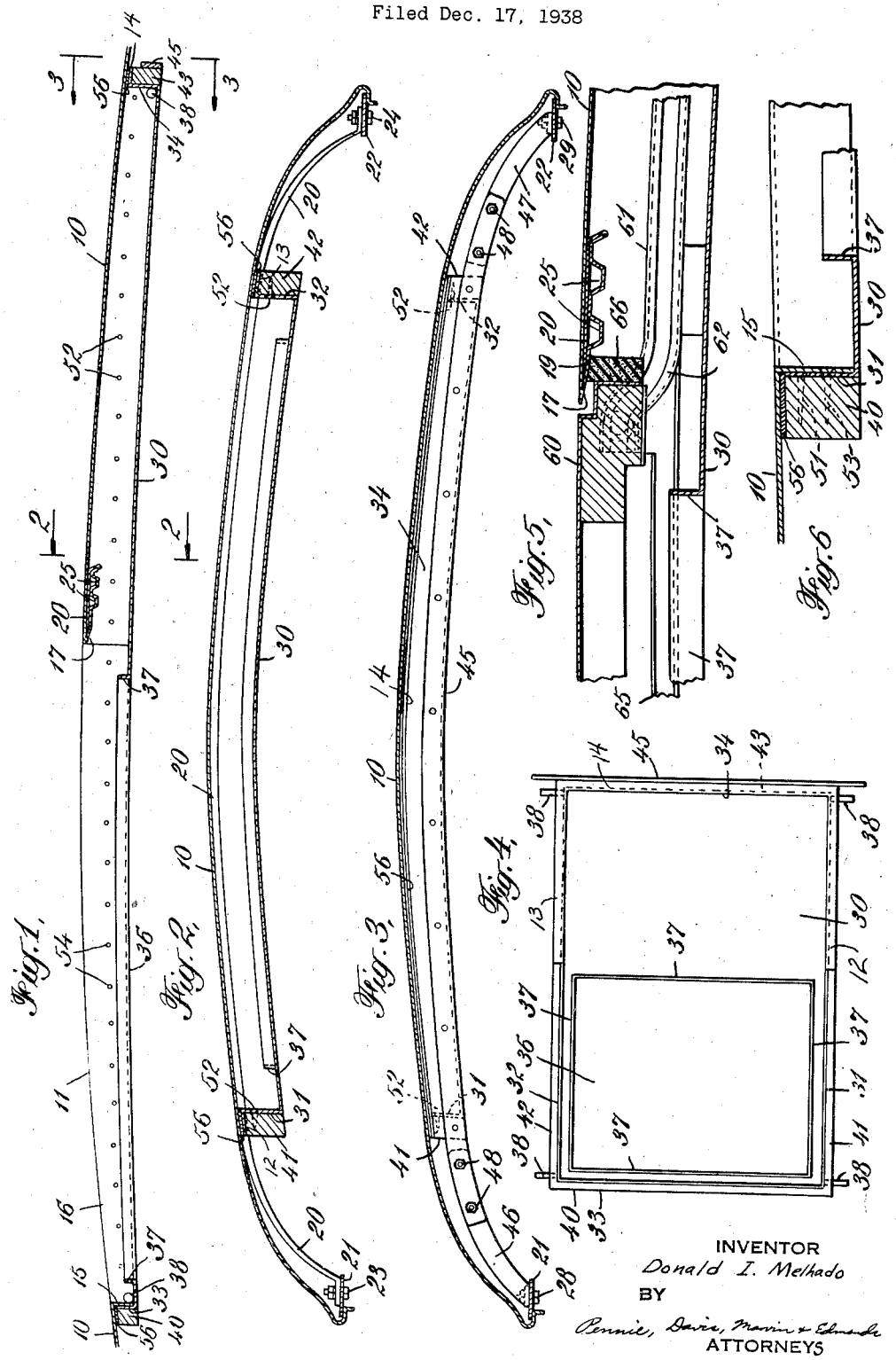

2,148,318

UNITED STATES PATENT OFFICE 2,148,318

VEHICLE ROOF STRUCTURE

Donald I. Melhado, New York, N. Y.

Application December 17, 1938, Serial No. 246,255

2 Claims. (Cl. 296—137)

This invention relates to roofs for vehicle bodies and more particularly it relates to vehicle body roofs which are provided with sliding panels whereby the roof may be opened or closed.

Vehicle roofs of this type have an opening of substantial size which may be opened or closed by a sliding panel supported on suitable means. The means for supporting the panel may be positioned within a water-check tray placed beneath and along the sides of the roof opening. This tray is provided with suitable ducts communicating with the outside of the vehicle body and serves to collect and dispose of any water which may enter between the edges of the roof opening and the adjacent edges of the panel when it is in the closed position.

In roof structures heretofore proposed, the rigidity and strength of the vehicle roof have been seriously impaired by the comparatively large opening in the roof. This has been especially true of vehicle roofs which are of one-piece all-metal construction. In providing such roofs, as well as other roofs, with sliding panels many limitations are imposed upon the designer. The roof must be adequately reenforced without marring the external lines of the car; and in addition, the sliding roof panel and the water-check tray must be adequately supported without seriously diminishing the head room in the vehicle itself.

It is an object of this invention to provide a roof construction for vehicle bodies having sliding roof panels which is sturdy, compact, easy to assemble and relatively simple in construction.

In accordance with the invention a one-piece sheet-metal water-check tray is secured at its front and sides to downwardly depending flanges along the front and sides of the opening in the vehicle roof. The rear of the water-check tray is provided with a transverse member which is rigidly secured to the sides of the vehicle roof. The all-metal one-piece construction of the water-check tray and the attachment of this directly to the downwardly depending flanges of the roof opening provides a roof structure which is particularly sturdy in construction and one in which the water-check tray contributes to the strength and reenforcement of the vehicle roof itself. To impart greater rigidity to the rear of the roof opening the invention further provides for a transverse brace across and adjacent to the rear of the opening, a flange along the rear of the opening being bent around the front edge of the brace. The combination of this roof reenforcement brace and the all-metal one-piece water-check tray secured to the roof in the manner described above imparts to the roof structure a remarkable compactness, rigidity and freedom from warpage.

In the more detailed description of the invention which follows, reference will be made to the accompanying drawing in which:

Fig. 1 is a longitudinal sectional view of a vehicle roof structure embodying the invention;

Fig. 2 is a transverse sectional view along the line 2—2 of Fig. 1 looking in the direction of the arrows;

Fig. 3 is a transverse sectional view along the line 3—3 of Fig. 1 looking in the direction of the arrows;

Fig. 4 is a plan view of a water-check tray assembly which is secured to the underside of the vehicle roof;

Fig. 5 is a fragmentary view of the rear portion of the opening in the vehicle roof showing a sliding panel in the closed position; and Fig. 6 is a detailed view of the front portion of Fig. 1 showing the means whereby the water-check tray assembly is attached to the front and sides of the vehicle roof opening.

In accordance with this invention a vehicle roof 10 having an opening 11 is provided with downwardly depending flanges 15 and 16 along the front and sides of the roof opening respectively. The rear of the roof opening is reenforced by a transverse brace 20 which is supported at opposite sides of the roof on rails 21 and 22 and secured thereto by bolts 23 and 24. Advantageously the transverse brace is provided with one or more stiffening ribs 25. The flange 17 along the rear edge of the roof opening is bent around and against the front portion of the transverse brace 20. The underside of the front portion 19 of the brace 20 is bevelled so that this portion of the brace is wedge-shaped in cross-section, as shown in greater detail in Fig. 5. This enables the thickness of the rear edge of the roof opening to be reduced to a minimum.

A sheet-metal one-piece water-check tray 30 having vertically extending flanges 31 and 32 along its sides and vertically extending flanges 33 and 34 along its front and rear respectively is secured along its front and sides to the downwardly depending flanges 15 and 16 of the roof opening. The portions of the side flanges 31 and 32 which underlie the rear of the roof are provided with horizontally extending flanges 12 and 13 respectively which are integral with the vertically extending side flanges. The rear flange 34 is provided with a similar integral horizontally extending flange 14. These horizontally extending flanges are advantageously curved to conform to the contour of the vehicle roof and thus make possible a better adjustment between the vehicle roof and the water-check tray.

The vertically extending flanges of the front and sides of the water-check tray are secured to the flanges of the roof opening by means of wooden strips of substantial thickness attached along the sides of the water-check tray as shown in the drawing. Thus, a wooden strip 40 is fastened to the front flange 33 of the water-check tray by a number of screws 51 (Fig. 6) spaced along the front of the water-check tray. The side flanges 31 and 32 are provided with similar wooden strips 41 and 42 extending from the front to the rear of the water-check tray. These strips are likewise secured to the flanges of the water-check tray by a number of screws 52 (Fig. 1) spaced at intervals along the side flanges of the tray. The depending flange 15 along the front of the roof opening is secured to the water-check tray by a number of screws 53 (Fig. 6) which pass through the flange 31 of the water-check tray into the wooden strip 40. The flanges 16 along the sides of the roof opening are secured to the side flanges of the water-check tray in the same manner by a number of screws 54 (Fig. 1).

The water-check tray is provided with an opening 36 having a vertically extending flange 37 along its periphery. The water-check tray is also provided at the front and rear with suitable drains 38 which conduct water in the tray to the outside of the vehicle body.

The rear of the water-check tray is supported by means of a transverse member 45 which is secured to the rear flange 34 of the water-check tray through the medium of a wooden strip 43 to which the rear flange 34 and the transverse member 45 are each attached. The transverse member 45 is supported at each end by curved arms 46 and 47 to which it is secured by bolts 48. The arms 46 and 47 are secured to the rails 21 and 22 at the sides of the roof by bolts 28 and 29 respectively.

The advantage of bevelling the underside of the front portion of the reenforcing brace 20 is demonstrated in Fig. 5 which shows a sliding roof panel 60 in the closed position. The sliding panel is supported at the rear on a slotted guide member 61, by means such as those shown in King Patent No. 2,007,865 or in Creteur application Serial No. 232,605. The guide member 61 curves upward at 62 to form a ramp which raises the panel flush with the adjacent portions of the vehicle roof when the panel is moved to the closed position. The front of the roof panel is supported on a longitudinal guide member 65 in any suitable manner (not shown). The rear edge of the sliding panel is provided with a strip of sponge rubber 66 the upper surface of which fits snugly against the rear edge of the roof opening when the panel is in the closed position. It will be apparent that by making the front portion of the reinforcing brace 20 wedge-shaped as shown at 19 the space between the rear edge of the roof opening and the rear edge of the panel may be maintained as small as possible. If the front portion of the roof reenforcement brace were substantially rectangular in cross-section, the bending of the roof flange 17 around this portion would cause a substantial bulge. This would necessitate widening the gap between the roof panel and the rear of the roof opening in order that the roof panel would clear the rear edge when it was being pushed downwardly and backwardly to open the roof.

In assembling the roof structure of the invention the reenforcing brace 20 along the rear of the roof opening is secured to the rails 21 and 22 at the sides of the roof. The flange 17 along the rear of the roof opening is then bent around and secured to the bevelled front portion 19 of the reenforcing brace. The water-check tray provided with the wooden strips 40, 41, 42 and 43 along its sides and the transverse member 45 along the rear as shown in Fig. 4 is then lifted into position under the vehicle roof. The front and side flanges along the roof opening are then secured to the water-check tray assembly and the transverse member 45 is bolted to the curved supporting arms 46 and 47 which have previously been secured to the rails 21 and 22. Strips of antisqueak material 56 are advantageously interposed between the upper surfaces of the water-check tray assembly and the underside of the vehicle roof.

Although the foregoing description of the invention refers to the use of wooden strips around the water-check tray as the means through which the tray is attached to the roof, it is of course to be understood that where suitable welding facilities are available the wooden strips may be dispensed with. Thus, the front and sides of the water-check tray may be welded directly to the downwardly depending flanges along the roof opening. Similarly, the transverse member 45 may be welded directly to the rear flange of the water-check tray. In addition, the reenforcing member 20 and the transverse member 45 may be welded, instead of bolted directly to the sides of the roof without departing from the invention.

I claim:

1. A vehicle roof structure adapted for use with a sliding roof panel comprising a roof having an opening therein, downwardly depending flanges along the front and sides of the roof opening, a one-piece sheet-metal water-check tray extending beneath the closed portion of the vehicle roof and having vertically extending flanges along its front, sides and rear, the front and side flanges of said water-check tray being secured respectively to the front and side flanges of the roof opening, the rear of said water-check tray being supported from the sides of the vehicle roof, that portion of the water-check tray which extends beneath the closed portion of the roof having a continuous web of metal extending between the side flanges and the rear flange of the tray, the space between said web and the vehicle roof forming a chamber into which the roof panel slides when the roof is opened.

2. A vehicle roof structure adapted for use with a sliding roof panel comprising a roof having an opening therein, downwardly depending flanges along the front and sides of the roof opening, a one-piece sheet-metal water-check tray extending beneath a closed portion of the vehicle roof and having vertically extending flanges along its front, sides and rear, the front and side flanges of said water-check tray being secured respectively to the front and side flanges of the roof opening, the rear of said water-check tray being secured to at least one curved supporting member rigidly mounted at the sides of the vehicle roof, that portion of the water-check tray which extends beneath the closed portion of the roof having a continuous web of metal extending between the side flanges and the rear flange of the tray, the space between said web and the vehicle roof forming a chamber into which the roof panel slides when the roof is opened.

DONALD I. MELHADO.